US010845189B2

(12) United States Patent
Perrett (10) Patent No.: US 10,845,189 B2
(45) Date of Patent: Nov. 24, 2020

(54) CALIBRATION FOR LASER INSPECTION (71) Applicant: UNITED TECHNOLOGIES CORPORATION, Farmington, CT (US)

(72) Inventor: Gordon A. Perrett, Andover, CT (US)

(73) Assignee: Raythoen Technologies Corporation, Farmington, CT (US)

( * ) Notice: Subject to any disclaimer, the term of this patent is extended or adjusted under 35 U.S.C. 154(b) by 0 days.

(21) Appl. No.: 16/366,590

(22) Filed: Mar. 27, 2019

(65) Prior Publication Data
US 2020/0309513 A1 Oct. 1, 2020

(51) Int. Cl.
G01B 11/14 (2006.01)
G01B 11/22 (2006.01)

(52) U.S. Cl.
CPC .......... G01B 11/22 (2013.01); G01B 2210/00 (2013.01)

(58) Field of Classification Search
CPC .... G01J 3/02; G01J 3/513; G01J 3/51; G01N 15/1459; G01N 21/65
USPC .......................................................... 356/614
See application file for complete search history.

(56) References Cited

U.S. PATENT DOCUMENTS

| 5,999,265 | A | 12/1999 | Dalancon et al. | |
|---|---|---|---|---|
| 6,205,240 | B1 | 3/2001 | Pietrzak et al. | |
| 8,899,535 | B2 * | 12/2014 | Ashford | F16M 11/041 248/161 |
| 9,013,716 | B2 | 4/2015 | Monks | |
| 2002/0021959 | A1 * | 2/2002 | Schauer | B23Q 3/186 414/744.2 |
| 2011/0162221 | A1 * | 7/2011 | Knoke | G01B 11/03 33/228 |
| 2013/0090039 | A1 * | 4/2013 | Duescher | B24B 49/00 451/5 |
| 2013/0324816 | A1 * | 12/2013 | Bechtel | A61B 5/74 600/331 |
| 2016/0270997 | A1 * | 9/2016 | Little | A61H 1/0262 |
| 2016/0364864 | A1 * | 12/2016 | Irschara | G01S 7/4972 |
| 2017/0003393 | A1 | 1/2017 | Monks | |
| 2017/0151694 | A1 * | 6/2017 | Sato | B29C 43/021 |

(Continued)

FOREIGN PATENT DOCUMENTS

JP 2003344022 12/2003
WO 2010003512 1/2010

OTHER PUBLICATIONS

European Patent Office, European Search Report dated Aug. 26, 2020 in Application No. 20163177.7.

Primary Examiner — Md M Rahman
(74) Attorney, Agent, or Firm — Snell & Wilmer LLP (57) ABSTRACT A method of calibrating a laser measurement device includes positioning a calibration part, having known geometric specifications, at varying distances from the laser measurement device (within a measurement depth-of-field of the laser measurement device). The detected geometric specifications, measured at these different positions, are compared with the known specification(s) of the calibration part in order to improve the accuracy of the calibration. A calibration standoff fixture having a plurality of adjustable legs may be used in conjunction with the method to facilitate changing the position of the calibration part relative to the laser measurement device.

15 Claims, 10 Drawing Sheets (56) References Cited

U.S. PATENT DOCUMENTS

| | | | |
|---|---|---|---|
| 2018/0021617 A1* | 1/2018 | Krull | A63B 21/00069 |
| | | | 482/128 |
| 2019/0150877 A1* | 5/2019 | Sun | G06T 5/001 |
| 2019/0187249 A1* | 6/2019 | Harmer | G01S 7/40 |

* cited by examiner

CALIBRATION FOR LASER INSPECTION

FIELD

The present disclosure relates to inspection devices, methods, and systems, and more specifically to calibrating laser measurement devices.

BACKGROUND

Certain parts, such as rotor elements of a gas turbine engine, are often inspected to ensure that such parts are sized correctly or otherwise have desired geometric specifications. For example, conventional inspection methods generally involve creating a mold of the part and/or utilizing shadowgraph procedures to detect if features of the part are improperly sized/oriented or if the features of the part otherwise have an incorrect geometry. Such conventional inspection methods are often time-consuming and labor intensive. Although hand-held laser measurement devices may decrease overall time for inspection, calibrating hand-held laser measurement device or often difficult due to varying users and inconsistencies of orientation/handling of the laser measurement device, which can skew the calibration.

SUMMARY

In various embodiments, the present disclosure provides a method of calibrating a laser measurement device. The method, according to various embodiments, includes coupling a calibration standoff fixture to the laser measurement device, the calibration standoff fixture comprising a plurality of adjustable legs and engaging the plurality of adjustable legs of the calibration standoff fixture against a calibration part with the plurality of adjustable legs comprising a first position. The method, according to various embodiments, further includes, with the plurality of adjustable legs comprising the first position and with the plurality of adjustable legs engaged against the calibration part, actuating the laser measurement device to measure a first detected specification of a feature of the calibration part. Still further, the method may include engaging the plurality of adjustable legs of the calibration standoff fixture against the calibration part with the plurality of adjustable legs comprising a second position different than the first position and, with the plurality of adjustable legs comprising the second position and with the plurality of adjustable legs engaged against the calibration part, actuating the laser measurement device to measure a second detected specification of the feature of the calibration part. Also, the method may include calibrating the laser measurement device by comparing a known specification of the feature of the calibration part with both the first detected specification and the second detected specification.

In various embodiments, the first position refers to a first height of the plurality of adjustable legs, the first height being defined as a first distance between the laser measurement device and the calibration part. Correspondingly, the second position may refer to a second height of the plurality of adjustable legs, the second height being defined as a second distance between the laser measurement device and the calibration part. In various embodiments, an angle of the laser measurement device relative to the feature of the calibration part remains constant in both the first position and the second position. In various embodiments, the laser measurement device comprises a nominal field-of-view position at a third distance from the laser measurement device and the laser measurement device also comprises a measurement depth-of-field defined as plus or minus a fourth distance relative to the third distance.

In various embodiments, calibrating the laser measurement device comprises adjusting reported results from the laser measurement device across the measurement depth-of-field. In various embodiments, the first distance equals the third distance plus at least 20% of the fourth distance and the second distance equals the third distance minus at least 20% of the fourth distance. In various embodiments, the first distance equals the third distance plus at least 50% of the fourth distance and the second distance equals the third distance minus at least 50% of the fourth distance. In various embodiments, the first distance equals the third distance plus at least 80% of the fourth distance and the second distance equals the third distance minus at least 80% of the fourth distance.

In various embodiments, the plurality of adjustable legs comprises a respective plurality of bolts threadably engaged with a body of the calibration standoff fixture, the plurality of bolts being rotatable relative to the calibration standoff fixture to change between the first position and the second position. The method may further include manufacturing the body of the calibration standoff fixture comprises using an additive manufacturing process.

Also disclosed herein, according to various embodiments, is a laser measurement device comprising a processor. In various embodiments, a tangible, non-transitory memory is configured to communicate with the processor, the tangible, non-transitory memory having instructions stored thereon that, in response to execution by the processor, cause the laser measurement device to perform various operations. The various operations may include receiving, by the processor, a first detected specification of a feature of a calibration part, receiving, by the processor, a second detected specification of the feature of the calibration part, and calibrating, by the processor, the laser measurement device by comparing a known specification of the feature of the calibration part with both the first detected specification and the second detected specification.

In various embodiments, receiving, by the processor, the first detected specification of the feature of the calibration part is performed in response to a plurality of adjustable legs of a calibration standoff fixture, which is coupled to the laser measurement device, being engaged against the calibration part with the plurality of adjustable legs comprising a first position. In various embodiments, wherein receiving, by the processor, the second detected specification of the feature of the calibration part is performed in response to the plurality of adjustable legs of the calibration standoff fixture being engaged against the calibration part with the plurality of adjustable legs comprising a second position. In various embodiments, the first position comprises a first height of the plurality of adjustable legs, the first height being defined as a first distance between the laser measurement device and the calibration part. In various embodiments, the second position comprises a second height of the plurality of adjustable legs, the second height being defined as a second distance between the laser measurement device and the calibration part. In various embodiments, an angle of the laser measurement device relative to the calibration part is constant in response to receiving, by the processor, the first detected specification of the calibration part and in response to receiving, by the processor, the second detected specification of the calibration part. In various embodiments, calibrating, by the processor, the laser measurement device comprises adjusting reported results from the laser measurement device across the measurement depth-of-field.

Also disclosed herein, according to various embodiments, is a calibration standoff fixture for a laser measurement device. The calibration standoff fixture may include a body, an attachment portion of the body, the attachment portion configured to be coupled to the laser measurement device, and a plurality of adjustable legs extending from the body. The plurality of adjustable legs may be configured to engage with a calibration part. The plurality of adjustable legs comprises a respective plurality of bolts threadably engaged with the body, the plurality of bolts being rotatable relative to the calibration standoff fixture to change a height of the plurality of bolts relative to the body, according to various embodiments. The body may comprise a plurality of threaded nuts embedded in the body such that the plurality of bolts are respectively received within the plurality of threaded nuts. In various embodiments, the plurality of adjustable legs comprises three adjustable legs.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding end portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, are methods, devices, assemblies, and systems for calibrating a laser measurement device. More specifically, the present provides a laser measurement device and a method for calibrating the laser measurement device using a calibration standoff fixture. Generally, once the laser measurement device has been calibrated, specific standoff fixtures may be customized for a specific part (or at least a specific type of part), and the specific standoff fixtures may be coupled to the calibrated laser measurement device to facilitate accuracy, repeatability, and reproducibility of inspection procedures, according to various embodiments. While numerous details are included herein pertaining to calibrating devices for inspecting components of a gas turbine engine (such as rotor disks), the calibration methods disclosed herein may be utilized in conjunction with laser measurement devices for inspecting other components/parts.

Figure 1:
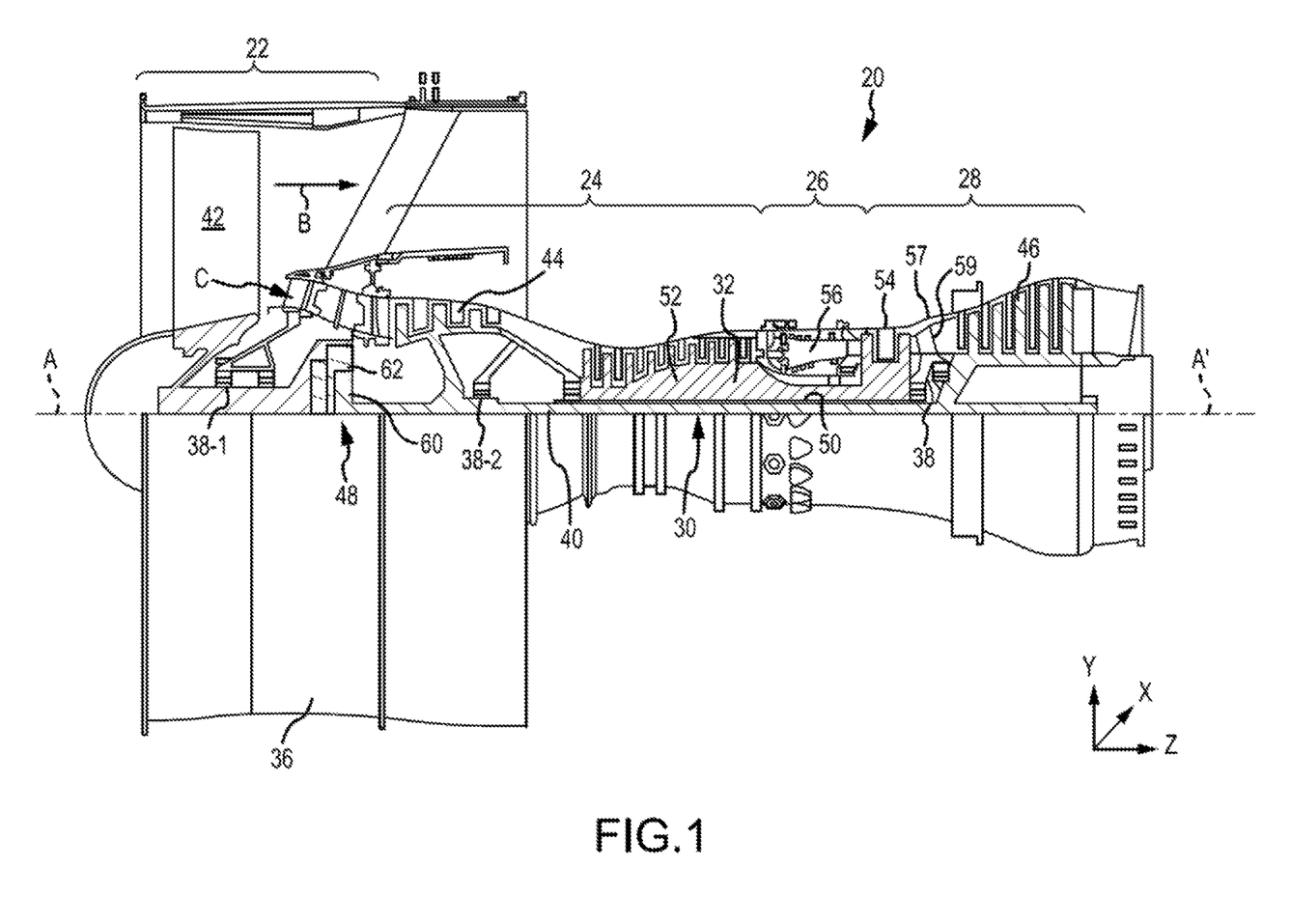
FIG. 1 is a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction (axial direction) on the provided xyz axis. The y direction on the provided xyz axis refers to a radial direction, and the x direction on the provided xyz axis refers to a circumferential direction. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Details pertaining to calibrating laser measurement devices are included below with reference to FIGS. 8 and 10. Said differently, these initial paragraphs of the specification discuss using customized standoff fixtures in conjunction with a laser measurement device, and subsequent paragraphs below, with reference to FIGS. 8 and 10, discuss how to calibrate laser measurement devices, according to various embodiments.

Figure 2:
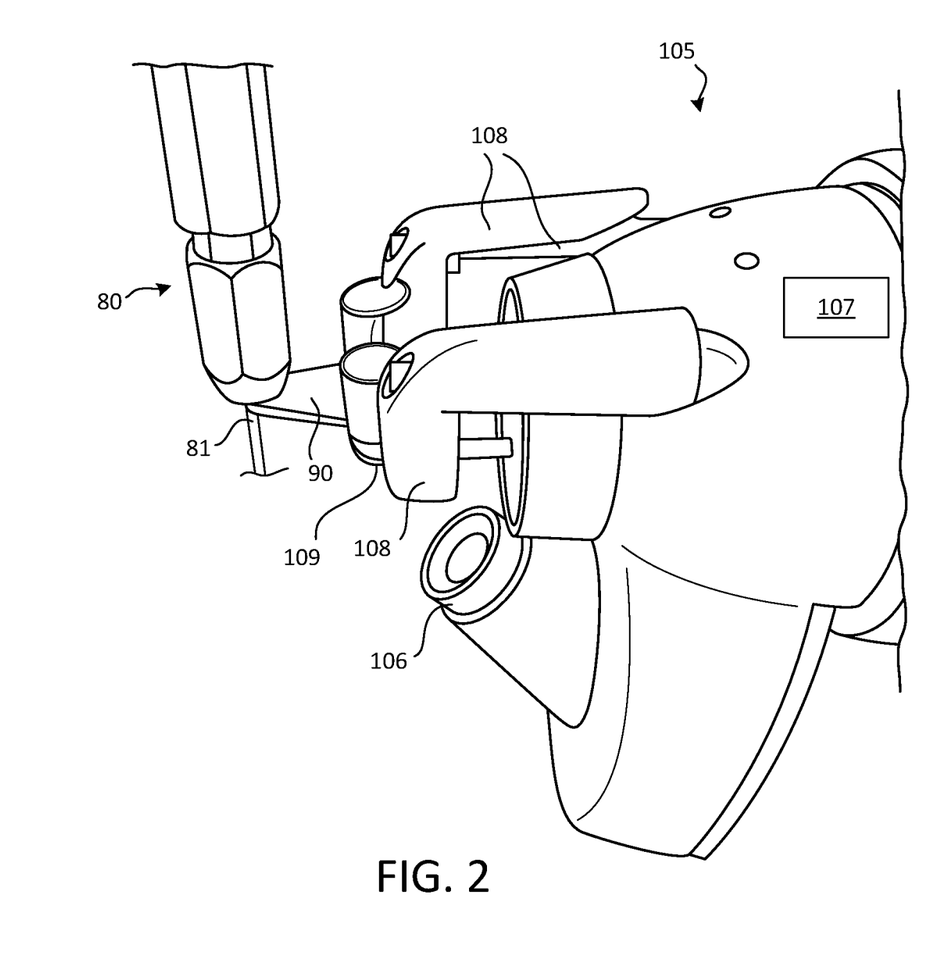
FIG. 2 is a perspective view of a laser measurement device, in accordance with various embodiments.

In various embodiments, and with reference to FIG. 2, a laser measurement device 105 is provided. The laser measurement device 105 includes one or more emitters, such as emitter 106, and one or more sensors, and the emitter(s) and sensors are generally configured to measure a geometric specification of a part, such as generic part 80, according to various embodiments. For example, a laser signal may be emitted from the emitter 106 toward the part be measured, and the sensor(s) of the laser measurement device 105 may detect/report geometric specification data in response to the emitted laser. Typically accompanying laser measurement devices is a spacer 90 configured to be positioned between the laser measurement device and the part(s) 80 to be inspected. Generally, the spacer 90 helps to locate the part 80 a proper distance away from the one or more emitters and sensors so the appropriate/desired feature 81 of the part 80 is properly positioned in the field-of-view of the laser measurement device 105. However, as mentioned above, conventional spacers 90 do not sufficiently restrain the laser measurement device 105 relative to the part 80, and thus the orientation, tilt, and/or rotation of the laser measurement device 105 relative to the part 80 can vary from one user to another or from one inspection to another. These variations decrease the repeatability and reproducibility of inspections, and thus adversely affect the accuracy of the inspection data.

Figure 9:
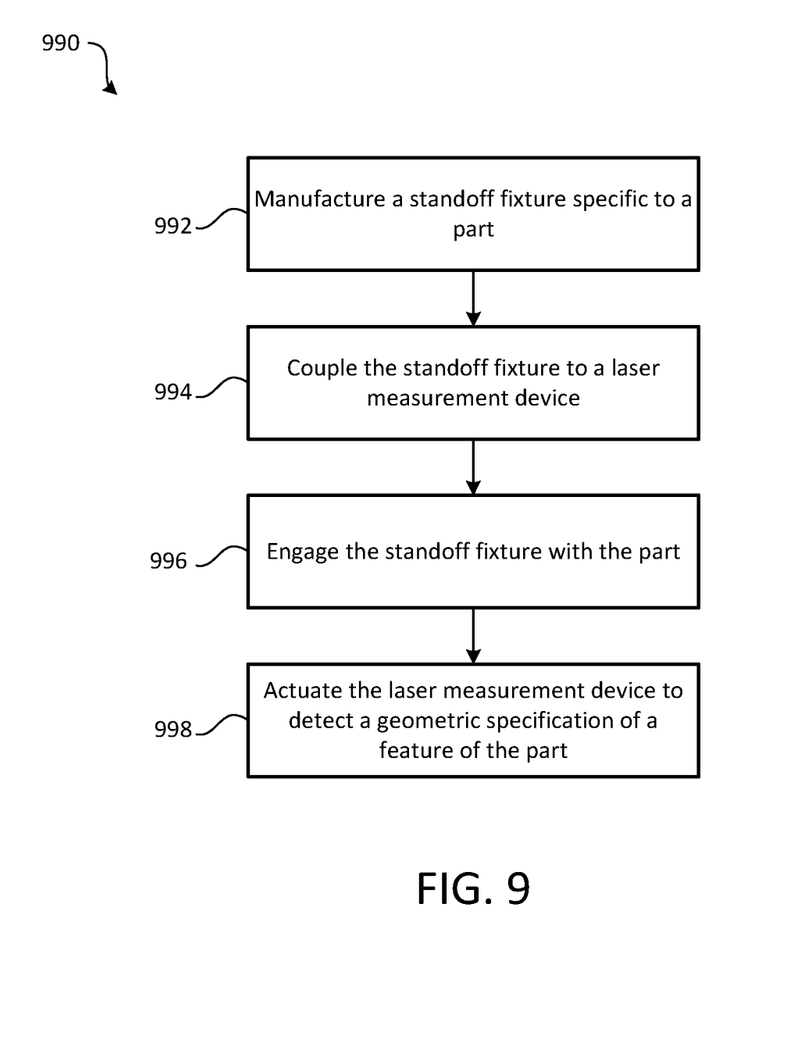
FIG. 9 is a schematic block diagram of a method of inspecting a part, in accordance with various embodiments.

In various embodiments, and with reference to FIG. 9, the present disclosure provides a method 990 of inspecting a part that overcomes the aforementioned shortcomings. The method 990 generally includes manufacturing a standoff fixture that is specific to the part at step 992, according to various embodiments. That is, instead of using a generic spacer, such as spacer 90, step 992 of the method 990 may include fabricating a custom standoff fixture to be coupled to a laser measurement device and positioned between the laser measurement device and the part to be inspected. Generally, the standoff fixture increases the repeatability, reproducibility, and overall accuracy of the inspection method 990, according to various embodiments.

At step 992 the standoff fixture may be specifically designed and manufactured for use with a specific part, or a specific type of part. For example, and as described in greater detail below, the part may be a component of a gas turbine engine 20 (FIG. 1), such as a rotor disk, and step 992 of the method 990 may include designing a standoff fixture having a plurality of legs that are precisely seated/engaged against the part. The customized standoff fixture may be utilized to facilitate inspection of multiple instances of the same part. In various embodiments, future inspections of the part, or future inspections of similar/comparable parts, are performed with the laser measurement device uniformly and consistently aligned and positioned relative to the part. Additional details pertaining to customized standoff fixtures are included below.

In various embodiments, the method 990 further includes coupling the standoff fixture to a laser measurement device at step 994, engaging the standoff fixture with the part to be inspected at step 996, and actuating the laser measurement device to detect a geometric specification of a feature of the part at step 998. In various embodiments, step 998 includes measuring more than one geometric specification of one or more features of the part. Further, step 996 may include engaging the standoff fixture to more than one part (e.g., separable parts) and step 998 may correspondingly include detecting geometric specification(s) of a plurality of parts.

In various embodiments, and with continued reference to FIG. 9, step 992 of the method 990 may include determining/identifying a specific feature of a part to be inspected and subsequently designing and manufacturing the standoff fixture in such a manner so that during step 996 of the method 990 the standoff fixture is seated in proximity to the feature/region of the part being inspected. Accordingly, step 992 may include manufacturing the standoff fixture to be specific to a feature of the part, and/or specific to a unique geometric specification of the feature of the part. In various embodiments, step 992 includes utilizing an additive manufacturing process to fabricate the standoff fixture.

In various embodiments, the standoff fixture includes a plurality of legs, as described in greater detail below. Step 992 may include specifically customized the shape, orientation, and/or extension direction of the legs based on the part and the feature of the part to be inspected. In various embodiments, step 996 may include engaging the plurality of legs so that contact surfaces of the legs are properly seated against the part to thereby properly position the laser measurement device relative to the part. For example, the standoff fixture may be manufactured at step 992 to have three legs (e.g., three points/locations of contact with the part), and thus the standoff fixture may benefit from tripod-like stability. In various embodiments, step 996 includes continuing to force the standoff fixture toward the part during step 998 to ensure the standoff fixture remains properly seated/engaged against the part.

Figure 3:
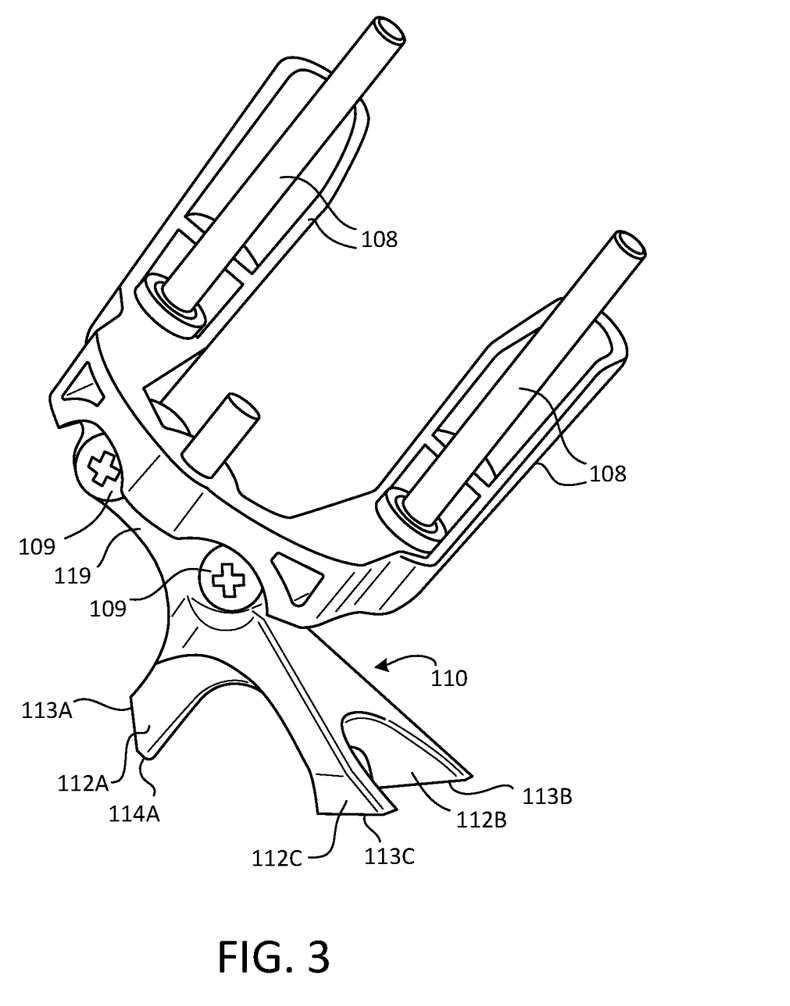
FIG. 3 is a perspective view of a standoff fixture coupled to a mounting interface of a laser measurement device, in accordance with various embodiments.

In various embodiments, and with reference to FIGS. 2 and 3, a standoff fixture 110 configured to be coupled to the laser measurement device 105 is provided. In FIG. 3, the laser measurement device 105 is not shown in order to avoid obscuring the clear depiction of the standoff fixture 110. However, mounting features 108 of the laser measurement device 105 are shown in FIG. 3 to show how the standoff fixture 110 may be coupled to and oriented relative to the laser measurement device 105. That is, the standoff fixture 110 may include an attachment portion 119 configured to be coupled to mounting features 108 of the laser measurement device 105 using fasteners 109 or other attachment mechanisms.

The standoff fixture 110, according to various embodiments, includes a plurality of legs, such as legs 112A, 112B, 112C. The plurality of legs 112A, 112B, 112C may be generally configured to engage with (e.g., be seated against) a part to be inspected. In various embodiments, and as mentioned above, the plurality of legs 112A, 112B, 112C may be specific to the part, and/or the feature of the part, being inspected. For example, the standoff fixture 110 may include a first leg 112A having one or more contact surfaces 113A, 114A, a second leg 112B having one or more contact surfaces 113B, and a third leg 112C having one or more contact surfaces 113C.

Figure 4:
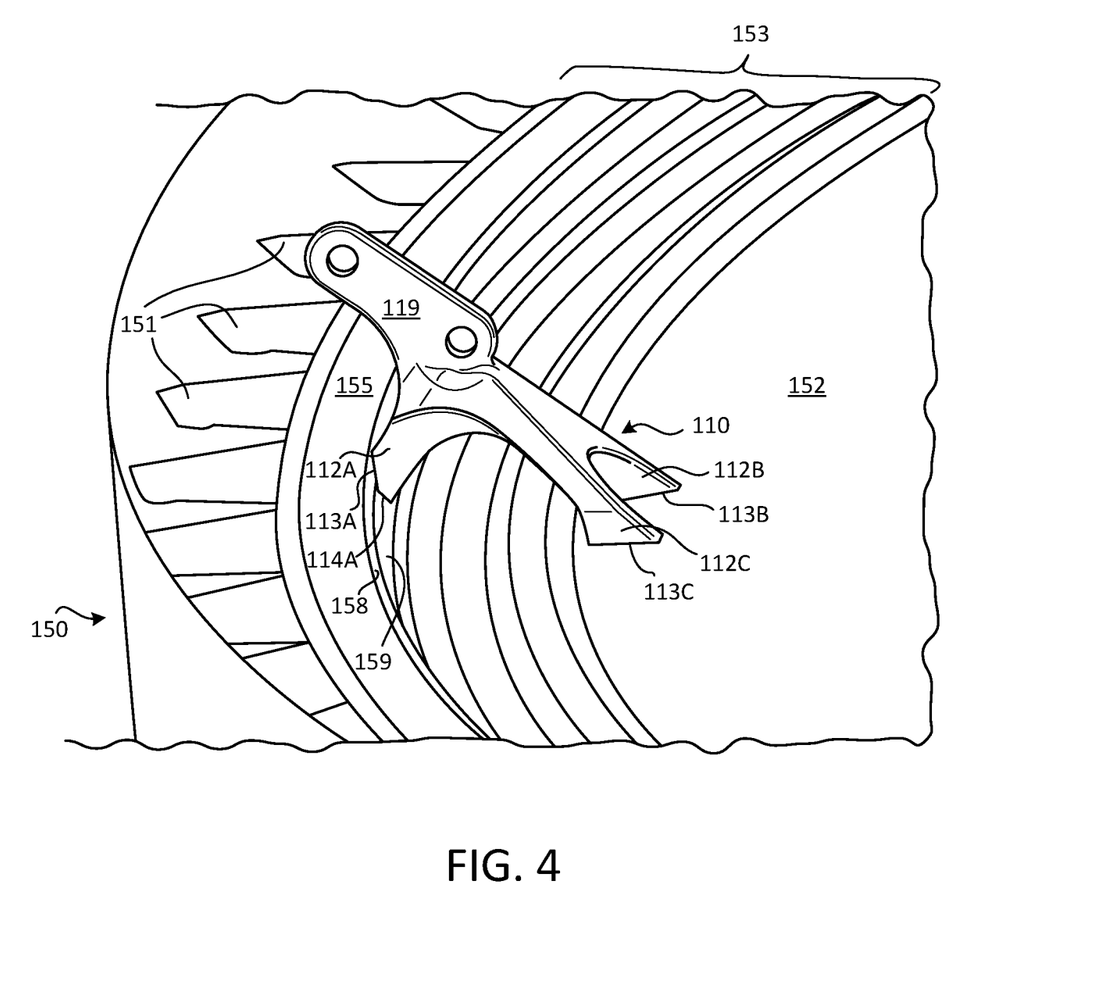
FIG. 4 is a perspective view of a standoff fixture engaged with a rotor disk, in accordance with various embodiments.
Figure 5:
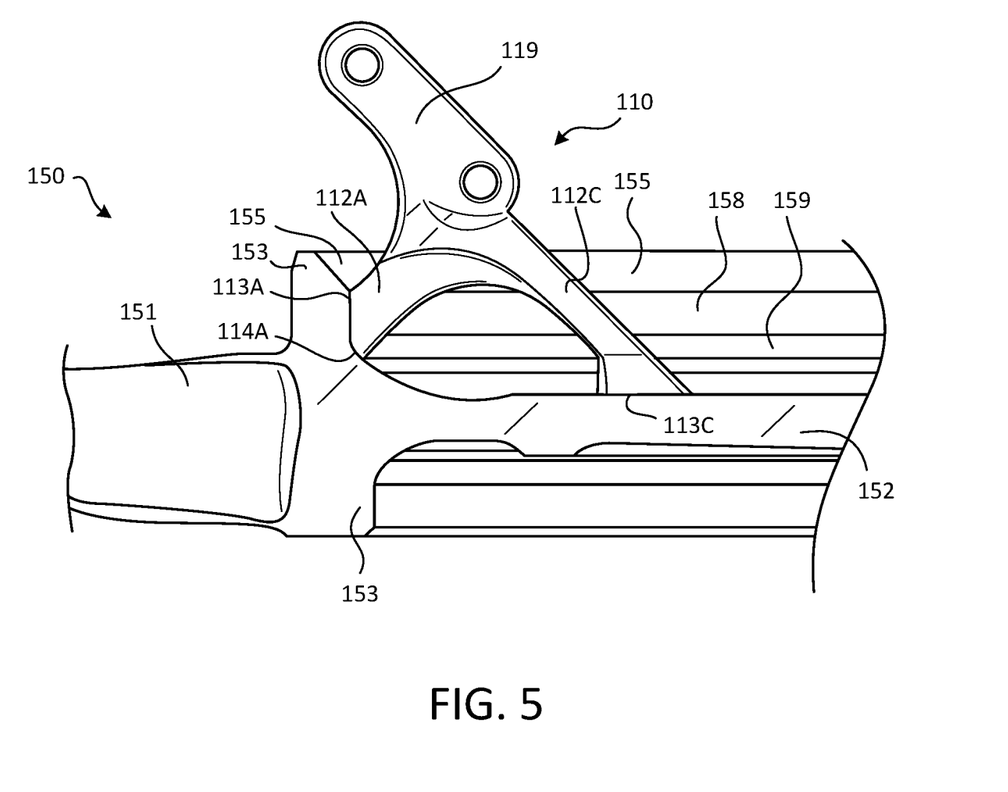
FIG. 5 is a plan view of a standoff fixture engaged with a rotor disk, in accordance with various embodiments.

In various embodiments, and with reference to FIGS. 4 and 5, the standoff fixture 110 is provided being positioned against a part to be inspected. During use (e.g., in practicing the method 990), the standoff fixture 110 would be coupled/mounted to the laser measurement device 105 (FIG. 2), and then the standoff fixture would be engaged against the part in the orientation shown in FIGS. 4 and 5, according to various embodiments. However, in order to avoid obscuring a clear depiction of the features of the standoff fixture 110 and the part against which it is engaged, the laser measurement device 105 (FIG. 2) is intentionally omitted from FIGS. 4 and 5.

In various embodiments, the part to be inspected may be a rotor disk 150 of the gas turbine engine 20, and thus the standoff fixture 110 may be configured and specifically designed/manufactured to engage the rotor disk 150. In various embodiments, because of the high rotational velocities of the rotor disks of a gas turbine engine, it may be important to ensure that rotor disks of a gas turbine engine are precisely manufactured in order to prevent damage to the blades 151 and/or other components of the gas turbine engine during operation. In various embodiments, the plurality of legs 112A, 112B, 112C are specifically manufactured to conformingly engage regions of the rotor disk 150 in order to enable the laser measurement device 105 (FIG. 2) to be actuated to determine/detect a geometric specification of a specific feature/region of the rotor disk 150. For example, the second leg 112B and the third leg 112C of the standoff fixture 110 may be configured to engage a web 152 of the rotor disk 150, and the first leg 112A may be configured to engage a flange 153 of the rotor disk 150.

More specifically, the second and third legs 112B, 112C may respectively comprise contact surfaces 113B, 113C that are parallel with and conform to a surface of the web 152 of the rotor disk 150 while the first leg 112A may comprise two contact surfaces 113A, 114A that contour/conform respective surfaces 158, 159 of the flange 153 of the rotor disk 150.

In various embodiments, the feature being inspected is a chamfer 155 of the flange 153 of the rotor disk 150. For example, the laser measurement device 105 (FIG. 2), being properly positioned relative to the rotor disk 150 via the standoff fixture 110, may be configured to detect/determine an angle or a height of the chamfer 155. That is, the geometric specification may be an angle or dimension (e.g., height) of a chamfer. In various embodiments, the standoff fixture 110 may be used to determine other geometric specifications, such as a radius of a feature.

Figure 6A:
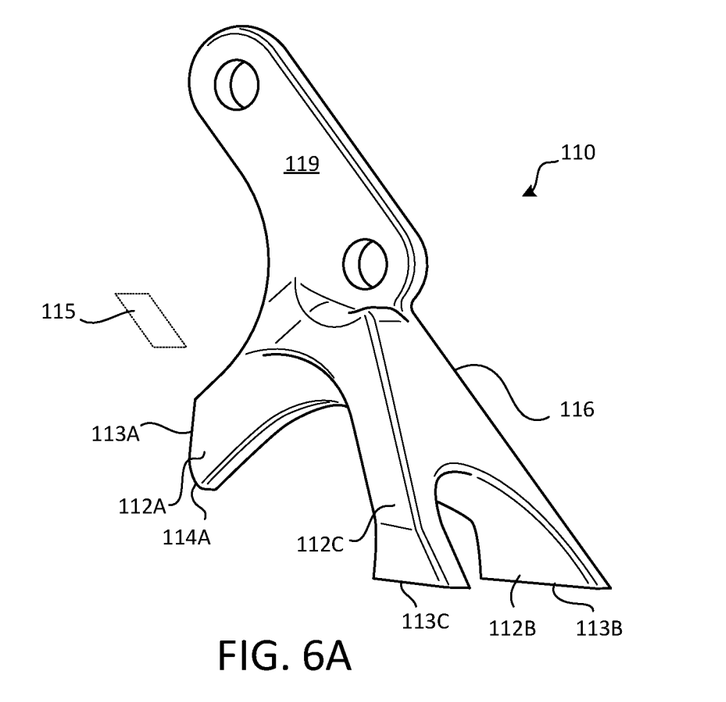
FIG. 6A is a perspective view of a standoff fixture, in accordance with various embodiments.
Figure 6B:
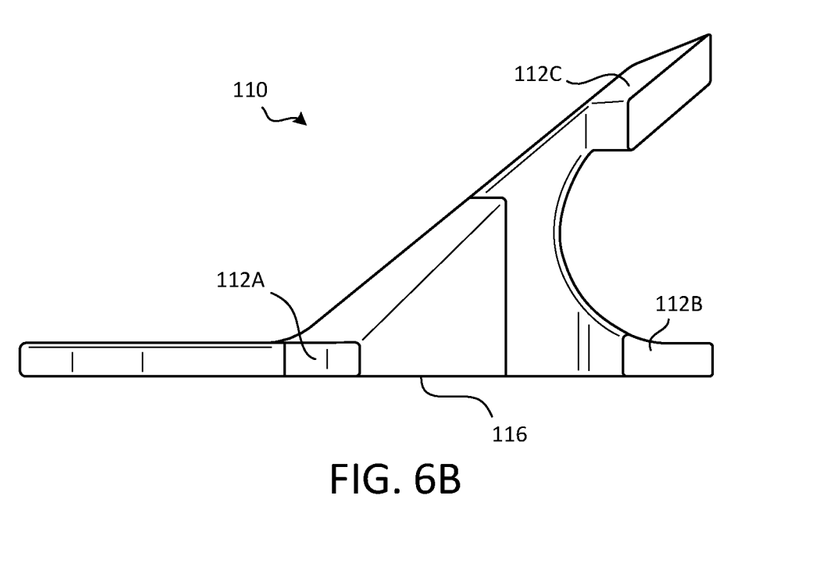
FIG. 6B is a plan view of a standoff fixture, in accordance with various embodiments.

In various embodiments, and with reference to FIGS. 6A and 6B, the standoff fixture 110 includes a planar surface 116 that extends across/along the attachment portion 119 and at least one leg of the plurality of legs 112A, 112B, 112C. That is, the planar surface 116 may be defined by, and thus may form a side of, the attachment portion 119 and one of the legs of the plurality of legs. For example, the planar surface 116 may extend/continue from the attachment portion 119 to a side of the first leg 112A. The planar surface 116 may further extend/continue to form a side of the second leg 112B as well. In various embodiments, the third leg 112C may be oriented oblique to the planar surface 116. In various embodiments, no portion of the standoff fixture 110 extends beyond the planar surface, thereby preventing any portion of the standoff fixture 110 extending in to the field-of-view 115 of the laser measurement device 105 (FIG. 2).

Figure 7:
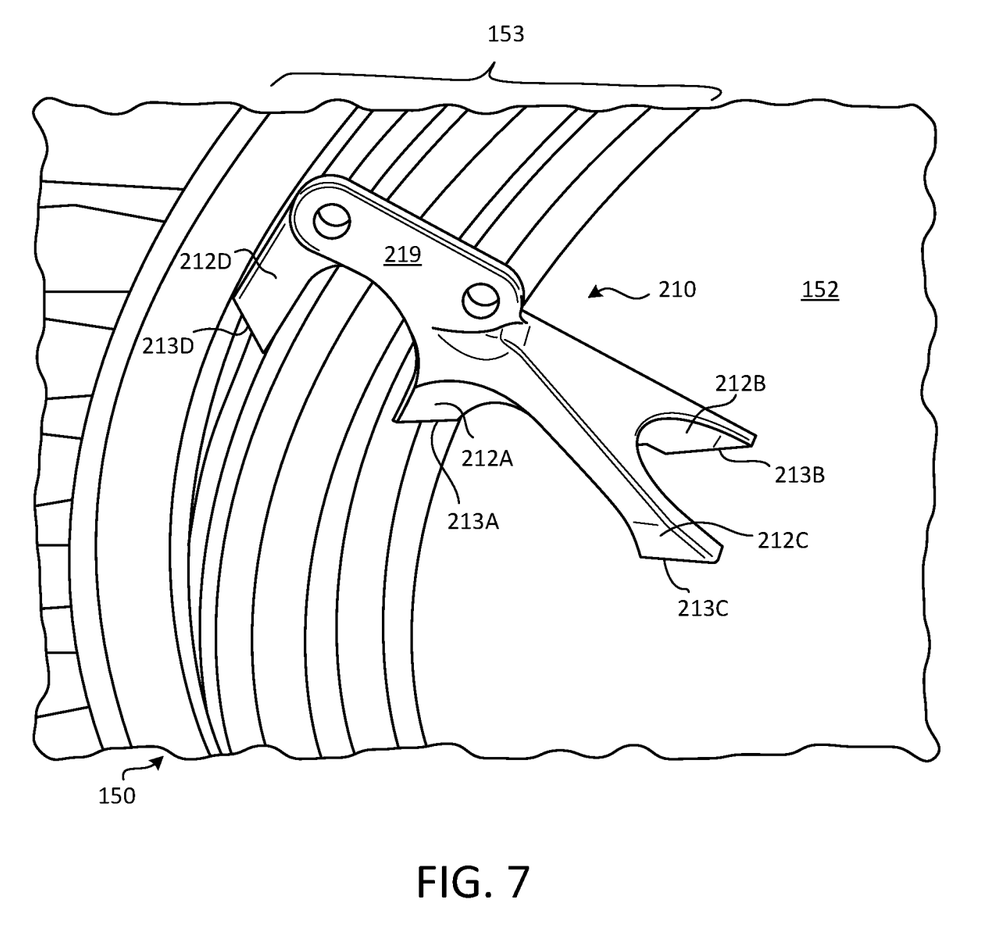
FIG. 7 is a perspective view of a standoff fixture engaged with a rotor disk, in accordance with various embodiments.

In various embodiments, and with reference to FIG. 7, the standoff fixture 210 may be configured to engage the rotor disk 150 to facilitate measurement of a radius of the rotor disk (e.g., a radius of a section of the flange 153 of the rotor disk 150). In various embodiments, the standoff fixture 210 includes an attachment portion 219, with three legs 212A, 212B, 212C extending from a first side of the attachment portion 219 and a fourth leg 212D extending from a second side of the attachment portion 219. Each of the legs 212A, 212B, 212C, 212D may include one or more contact surfaces 213A, 213B, 213C, 213D for engaging and conforming with respective surfaces/regions of the rotor disk 150. In various embodiments, the radius to be measured is generally between the first leg 212A and the fourth leg 212D.

Figure 8:
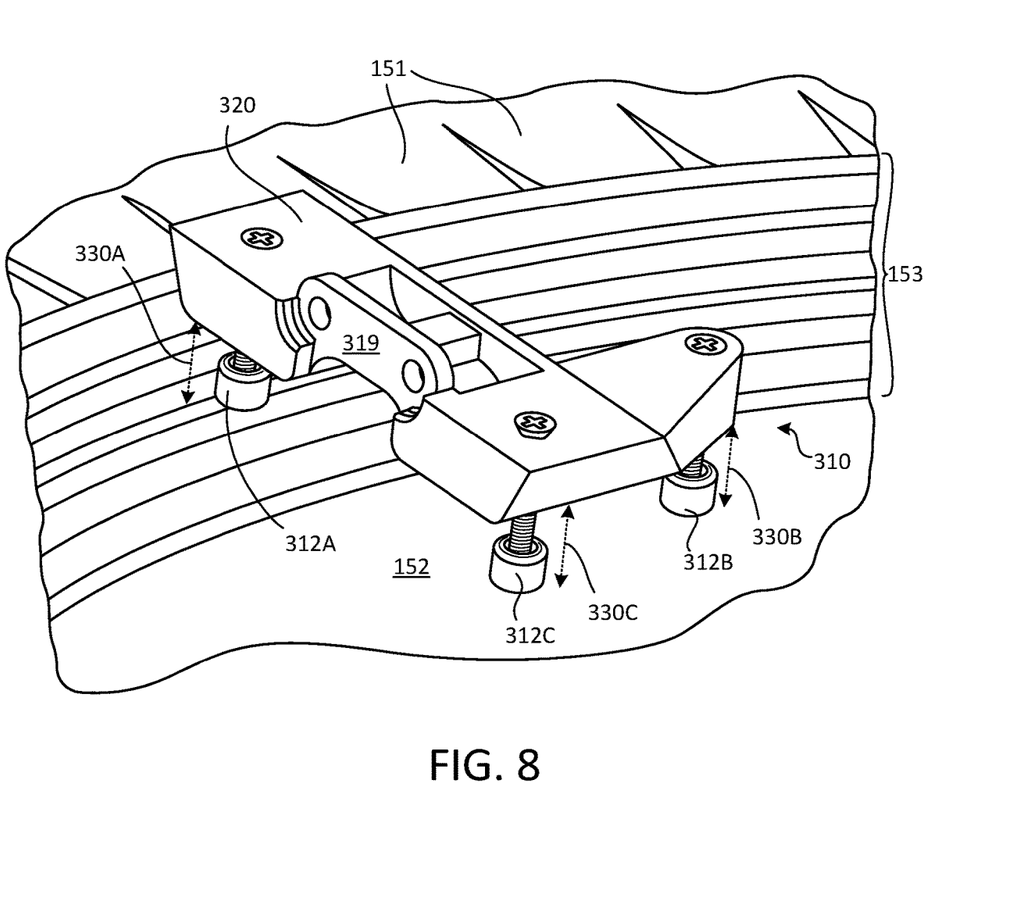
FIG. 8 is a perspective view of a standoff fixture having a plurality of legs with dimensions that can be varied, in accordance with various embodiments.

In various embodiments, and with reference to FIG. 8, the standoff fixture 310 may include a plurality of legs 312A, 312B, 312C having adjustable/customizable dimensions. That is, the length of the legs 312A, 312B, 312C of the standoff fixture 310 may be varied based on the specific feature to be inspected or based on the specific geometric specification to be determined. In various embodiments, for example, the attachment portion 319 may be a portion of a body 320 of the standoff fixture 310, and the legs 312A, 312B, 312C may be threadably engaged with the body 320 of the standoff fixture 310 to allow the distance of their respective heads from the body 320 to be respectively adjusted based on the shape of the part being inspected. In various embodiments, the standoff fixture 310 may be utilized to detect/determine the presence and/or magnitude of a mismatch between parts.

In various embodiments, and with renewed reference to FIG. 2, the laser measurement device 105 may include one or more processors 107 (depicted schematically). As described in greater detail below, the one or more processors 107 may be integrated into a controller or control system of the laser measurement device 105. The controller may include a standalone computer system separate from the laser measurement device 105 and in electronic communication with the laser measurement device 105. The laser measurement device 105 may further include one or more tangible, non-transitory memories, and the one or more processors 107 may be capable of implementing logic. For example, the one or more processors 107 may be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor(s) 107 may be configured to implement various logical operations in response to execution of instructions, for example, instructions stored on the non-transitory memory (e.g., tangible, computer-readable medium). As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The one or more processors 107 of the laser measurement device 105 are configured to receive and process the geometric specification data from the one or more emitters and sensors. Conventional methods of calibrating a laser measurement device typically include utilizing a spacer positioned between the laser measurement device and a calibration part, such as part 80 in FIG. 2. The calibration part may have a feature with known geometric specifications (e.g., feature 81 in FIG. 2), and thus conventional methods of calibrating a laser measurement device would typically include comparing a detected geometric specification of the feature of the calibration part with the actual/known geometric specification and then adjusting the measurements reported by the laser measurement device based on the comparison. However, as mentioned above, conventional spacers 90 do not sufficiently restrain the laser measurement device 105 relative to the calibration part (e.g., part 80), and thus the orientation, tilt, and/or rotation of the laser measurement device 105 relative to the calibration part can skew the accuracy of the calibration.

Figure 10:
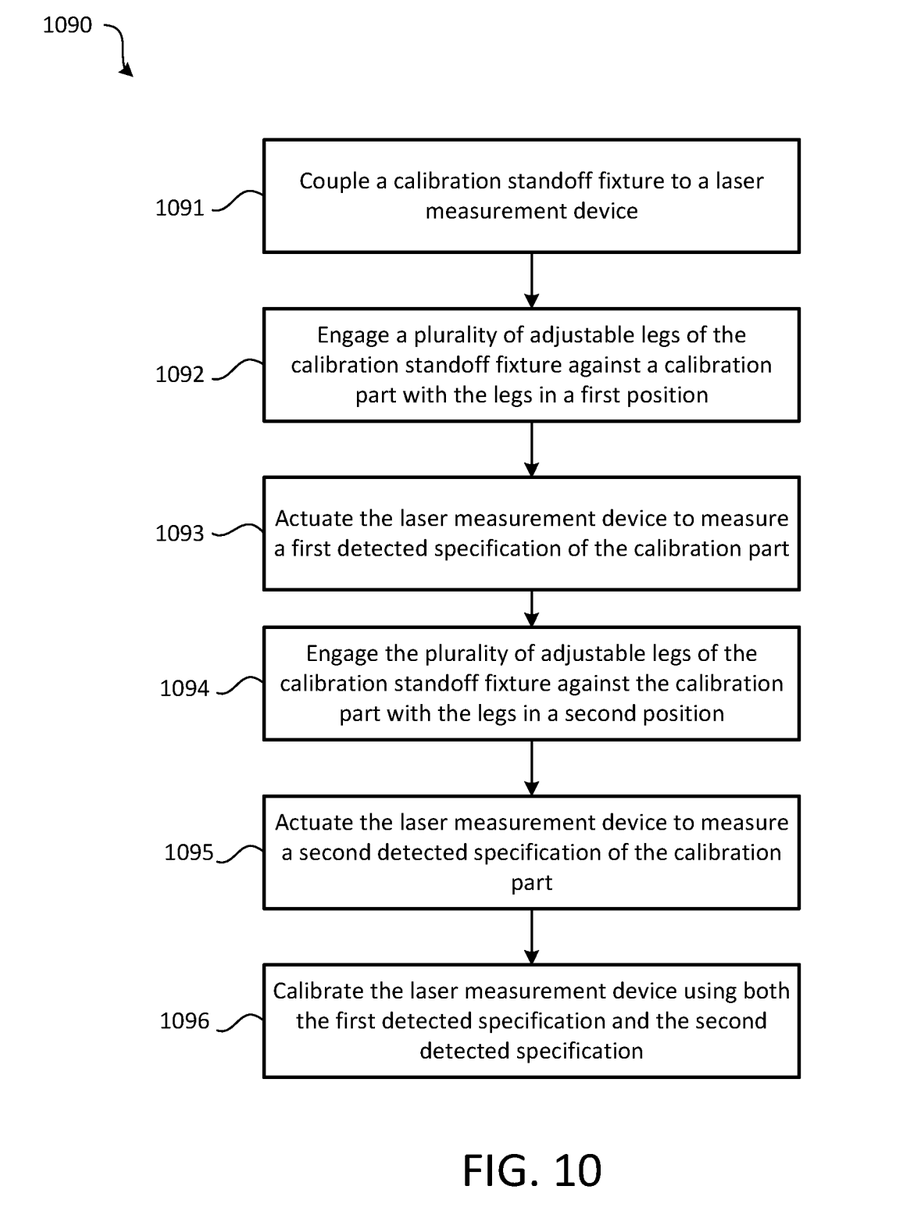
FIG. 10 is a schematic block diagram of a method of calibrating a laser measurement device, in accordance with various embodiments.

In various embodiments, and with reference to FIG. 10, a method 1090 of calibrating a laser measurement device is provided. The method 1090, according to various embodiments, includes coupling a calibration standoff fixture to the laser measurement device 105 at step 1091. The calibration standoff fixture may be the standoff fixture 310 shown in FIG. 8 and thus may include a plurality of adjustable legs 312A, 312B, 312C, according to various embodiments. Additional details pertaining to the calibration standoff feature 310 are included below with reference to FIG. 8. Returning to FIG. 10, the method 1090 may further include engaging the plurality of adjustable legs of the calibration standoff fixture against a calibration part with the plurality of adjustable legs comprising a first position at step 1092. Said differently, step 1092 may include adjusting the plurality of adjustable legs such that the legs are in a first position, and engaging the legs (in the first position) against the calibration part.

The method 1090 may further include, with the plurality of adjustable legs being in the first position and with the plurality of adjustable legs engaged against the calibration part, actuating the laser measurement device to measure a first detected specification of the calibration part at step 1093. That is, step 1093 may include measuring, with the laser measurement device positioned a first distance away from the calibration part, a feature of the calibration part that has a known geometric specification. The method 1090 may further include engaging the plurality of adjustable legs of the calibration standoff fixture against a calibration part with the plurality of adjustable legs comprising a second position at step 1094. Said differently, step 1094 may include adjusting the plurality of adjustable legs (e.g., from the first position) such that the legs are in a second position (different than the first position). With the plurality of adjustable legs in the second position and with the plurality of adjustable legs engaged against the calibration part, the method 1090 may include actuating the laser measurement device (e.g., a second time) to measure a second detected specification of the calibration part at step 1095. That is, step 1095 may include measuring, with the laser measurement device positioned a second distance away from the calibration part, a feature of the calibration part that has a known geometric specification. Still further, the method 1090 may include calibrating the laser measurement device by comparing the known specification of the calibration part with both the first detected specification and the second detected specification at step 1096.

In various embodiments, the laser measurement device comprises a nominal field-of-view (e.g., similar to field-of-view 115 mentioned above with reference to FIG. 6A). That is, the laser measurement device may be configured to accurately measure/detect the geometric specification(s) of parts disposed a certain distance away from its emitter(s)/sensor(s). This distance, referred to herein as the third distance, represents the position of the nominal field-of-view relative to the laser measurement device. The laser measurement device may further comprise a measurement depth-of-field defined as the spatial window around the field-of-view position where the detected geometric specifications reported by the laser measurement device are substantially accurate. That is, the measurement depth-of-field refers to the spatial tolerance of the laser measurement device. For example, the measurement depth-of-field may be defined as plus or minus a fourth distance relative to the aforementioned third distance (e.g., the nominal field-of-view position).

Accordingly, in various embodiments, step 1096 of the method 1090 includes adjusting reported results from the laser measurement device across the measurement depth-of-field of the laser measurement device. In other words, by taking measurements of the calibration part at different positions within the measurement depth-of-field, and subsequently comparing the detected geometric specifications with the known specification(s), the accuracy of the calibration is improved. For example, the first position of the plurality of adjustable legs (introduced at step 1092) may refer to a first height of the plurality of adjustable legs, with the first height being defined as a first distance between the laser measurement device and the calibration part. Correspondingly, the second position of the plurality of adjustable legs (introduced at step 1094) may refer to a second height of the plurality of adjustable legs, the second height being defined as a second distance between the laser measurement device and the calibration part. In various embodiments, the distance between the body of the calibration standoff fixture and the calibration part is the only variable that changes between the first position and the second position. That is, for example, the angle and/or orientation of the laser measurement device (e.g., and the calibration standoff fixture coupled thereto) relative to the calibration part remains constant in both the first position and the second position.

The first and second distances may refer to positions that fall within the measurement depth-of-field of the laser measurement device. That is, with the plurality of adjustable legs in the first position, the calibration part may be a first distance away from the laser measurement device such that the calibration part is disposed within the measurement depth-of-field. Correspondingly, with the plurality of adjustable legs in the second position, the calibration part may be a second distance away from the laser measurement device such that the calibration part is disposed within the measurement depth-of-field. In various embodiments, the first distance equals the third distance plus at least 20% of the fourth distance and the second distance equals the third distance minus at least 20% of the fourth distance. In various embodiments, the first distance equals the third distance plus at least 50% of the fourth distance and the second distance equals the third distance minus at least 50% of the fourth distance. In various embodiments, the first distance equals the third distance plus at least 80% of the fourth distance and the second distance equals the third distance minus at least 80% of the fourth distance.

In various embodiments, and with reference to FIG. 2, the processor 107 of the laser measurement device 105 may execute instructions stored on the tangible, non-transitory memory to cause the laser measurement device 105 to perform various operations. The various operations may include, receiving, by the processor 107, a first detected specification of a calibration part and receiving, by the processor 107, a second detected specification of the calibration part. Further, the various operations may include calibrating, by the processor, the laser measurement device by comparing a known specification of the calibration part with both the first detected specification and the second detected specification. Receiving, by the processor, the first detected specification of the calibration part may be performed in response to the plurality of adjustable legs of the calibration standoff fixture, which is coupled to the laser measurement device, being engaged against the calibration part with the plurality of adjustable legs comprising the first position. Correspondingly, receiving, by the processor, the second detected specification of the calibration part may be performed in response to the plurality of adjustable legs of the calibration standoff fixture, still coupled to the laser measurement device, being engaged against the calibration part with the plurality of adjustable legs comprising the second position (different than the first position).

In various embodiments, as mentioned above, the first position comprises the first height of the plurality of adjustable legs, the first height being defined as the first distance between the laser measurement device and the calibration part. In various embodiments, the second position comprises the second height of the plurality of adjustable legs, the second height being defined as the second distance between the laser measurement device and the calibration part. In various embodiments, an angle of the laser measurement device relative to the calibration part is constant in response to receiving, by the processor, the first detected specification of the calibration part and in response to receiving, by the processor, the second detected specification of the calibration part.

In various embodiments, and with reference to FIG. 8, the aforementioned standoff fixture 310 may be a calibration standoff fixture (e.g., may be used to calibrate the laser measurement device 105). Accordingly, the plurality of adjustable legs 312A, 312B, 312C may be adjusted to change the position of the body 320 of the calibration standoff fixture 310 relative to the calibration part. That is, the distances 330A, 330B, 330C may be varied in order to change the position of the calibration part within the measurement depth-of-field of the laser measurement device for the purpose of improving the accuracy of the calibration, as described above.

In various embodiments, the plurality of adjustable legs 312A, 312B, 312C comprises a respective plurality of bolts threadably engaged with the body 320, the plurality of bolts being rotatable relative to the calibration standoff fixture to change a height of the plurality of bolts relative to the body. In various embodiments, the body 320 of the calibration standoff fixture includes a plurality of threaded nuts embedded in the body 320 such that the plurality of bolts are respectively received within the plurality of threaded nuts. In various embodiments, the calibration standoff fixture may have a tripod configuration, and thus the plurality of adjustable legs may include three adjustable legs.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of calibrating a laser measurement device, the method comprising:
coupling a calibration standoff fixture to the laser measurement device, the calibration standoff fixture comprising a plurality of adjustable legs;
engaging the plurality of adjustable legs of the calibration standoff fixture against a calibration part with the plurality of adjustable legs comprising a first position;
with the plurality of adjustable legs comprising the first position and with the plurality of adjustable legs engaged against the calibration part, actuating the laser measurement device to measure a first detected specification of a feature of the calibration part;
engaging the plurality of adjustable legs of the calibration standoff fixture against the calibration part with the plurality of adjustable legs comprising a second position different than the first position;
with the plurality of adjustable legs comprising the second position and with the plurality of adjustable legs engaged against the calibration part, actuating the laser measurement device to measure a second detected specification of the feature of the calibration part; and
calibrating the laser measurement device by comparing a known specification of the feature of the calibration part with both the first detected specification and the second detected specification.

2. The method of claim 1, wherein:
the first position comprises a first height of the plurality of adjustable legs, the first height being defined as a first distance between the laser measurement device and the calibration part; and
the second position comprises a second height of the plurality of adjustable legs, the second height being defined as a second distance between the laser measurement device and the calibration part.

3. The method of claim 2, an angle of the laser measurement device relative to the feature of the calibration part remains constant in both the first position and the second position.

4. The method of claim 2, wherein:
the laser measurement device comprises a nominal field-of-view position at a third distance from the laser measurement device; and
the laser measurement device comprises a measurement depth-of-field defined as plus or minus a fourth distance relative to the third distance.

5. The method of claim 4, wherein calibrating the laser measurement device comprises adjusting reported results from the laser measurement device across the measurement depth-of-field.

6. The method of claim 4, wherein:
the first distance equals the third distance plus at least 20% of the fourth distance; and
the second distance equals the third distance minus at least 20% of the fourth distance.

7. The method of claim 4, wherein:
the first distance equals the third distance plus at least 50% of the fourth distance; and
the second distance equals the third distance minus at least 50% of the fourth distance.

8. The method of claim 4, wherein:
the first distance equals the third distance plus at least 80% of the fourth distance; and
the second distance equals the third distance minus at least 80% of the fourth distance.

9. The method of claim 1, wherein the plurality of adjustable legs comprises a respective plurality of bolts threadably engaged with a body of the calibration standoff fixture, the plurality of bolts being rotatable relative to the calibration standoff fixture to change between the first position and the second position.

10. The method of claim 9, further comprising manufacturing the body of the calibration standoff fixture comprises using an additive manufacturing process.

11. A laser measurement device comprising:
a processor, wherein a tangible, non-transitory memory is configured to communicate with the processor, the tangible, non-transitory memory having instructions stored thereon that, in response to execution by the processor, cause the laser measurement device to perform operations comprising:
receiving, by the processor, a first detected specification of a feature of a calibration part;
receiving, by the processor, a second detected specification of the feature of the calibration part; and
calibrating, by the processor, the laser measurement device by comparing a known specification of the feature of the calibration part with both the first detected specification and the second detected specification;
wherein receiving, by the processor, the first detected specification of the feature of the calibration part is performed in response to a plurality of adjustable legs of a calibration standoff fixture, which is coupled to the laser measurement device, being engaged against the calibration part with the plurality of adjustable legs comprising a first position.

12. The laser measurement device of claim 11, wherein receiving, by the processor, the second detected specification of the feature of the calibration part is performed in response to the plurality of adjustable legs of the calibration standoff fixture being engaged against the calibration part with the plurality of adjustable legs comprising a second position.

13. The laser measurement device of claim 12, wherein:
the first position comprises a first height of the plurality of adjustable legs, the first height being defined as a first distance between the laser measurement device and the calibration part; and
the second position comprises a second height of the plurality of adjustable legs, the second height being defined as a second distance between the laser measurement device and the calibration part.

14. The laser measurement device of claim 13, an angle of the laser measurement device relative to the feature of the calibration part is constant in response to receiving, by the processor, the first detected specification of the feature of the calibration part and in response to receiving, by the processor, the second detected specification of the feature of the calibration part.

15. The laser measurement device of claim 13, wherein:
the laser measurement device comprises a nominal field-of-view position at a third distance from the laser measurement device; and
the laser measurement device comprises a measurement depth-of-field defined as plus or minus a fourth distance relative to the third distance.

* * * * *